United States Patent Office 3,412,704
Patented Nov. 26, 1968

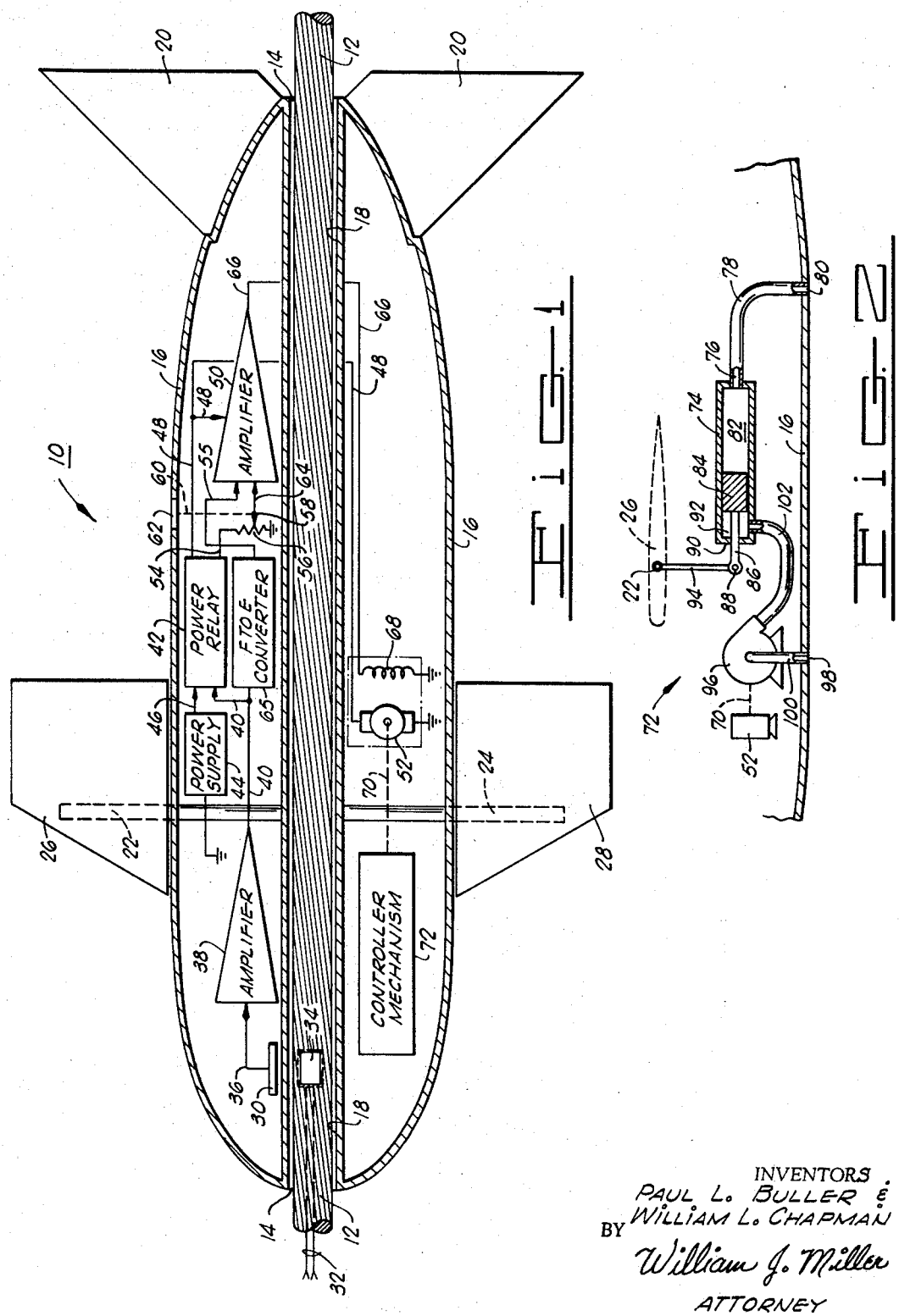

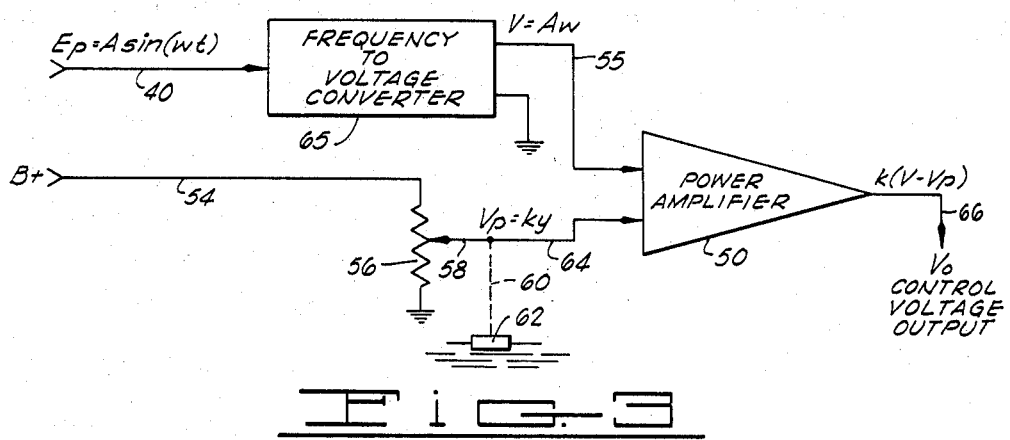
Fig. 3
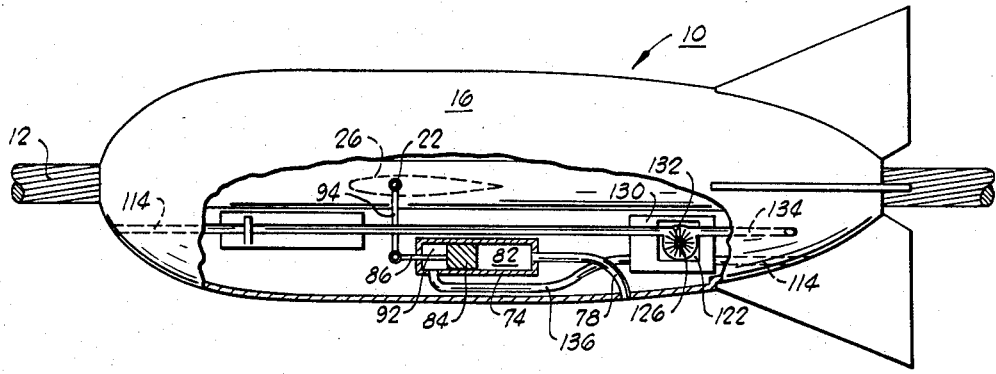
Fig. 4
Fig. 5
INVENTORS
PAUL L. BULLER &
WILLIAM L. CHAPMAN
BY William J. Miller
ATTORNEY

3,412,704
CABLE DEPTH CONTROLLER
Paul L. Buller and William L. Chapman, Ponca City, Okla., assignors to Continental Oil Company, Ponca City, Okla., a corporation of Delaware
Filed Nov. 6, 1967, Ser. No. 680,752
13 Claims. (Cl. 114—235)

ABSTRACT OF THE DISCLOSURE

Apparatus for remotely adjustable cable depth control wherein one or more paravanes employed to maintain a cable or seismic streamer at a predetermined depth are adjustable by means of a remotely energized transmission linkage. A paravane having adjustable diving planes connected for positive or negative attack angles, and wherein a remotely generated signal transmission is detected at the paravane and the detected signal is employed to energize and to operate depth adjusting structure which will respond to a different, predetermined ambient water pressure to maintain the paravane at a different desired depth.

Cross reference to related applications

This invention is particularly suited for use in a paravane of the type used on a marine seismic cable, such paravane being the particular subject matter of the co-pending application of Jimmy R. Cole and Paul L. Buller entitled, "Seismic Cable Depth Control Apparatus," Ser. No. 629,276, filed on Apr. 7, 1967, and assigned to the present assignee. Another closely related application is that of Jimmy R. Cole entitled "Remotely Controllable Pressure Responsive Apparatus," Ser. No. 672,341 filed on Oct. 2, 1967, and also assigned to the present assignee.

Background of the invention

*Field of the Invention.*—The invention relates generally to pressure-responsive actuating devices and, more particularly, but not by way of limitation, it relates to an improved actuating device in which the operating depth of the paravane is remotely adjustable.

*Description of the prior art.*—The prior art includes various teachings directed to different types of paravanes which have adjustable diving plane or planes and which provide additional facility to enable operation at a predetermined depth when towed through the water. It is known to provide mechanism for assessing the depth of operation of a paravane and to attempt to provide for automatic plane adjustment in response to such continuous depth assessment. Various depth control devices of varied effectiveness are known, but none of the prior art proposals supplies the degree of reliability and accuracy which has been found necessary in the marine seismic prospecting art.

Summary of the invention

The present invention contemplates a control system for one or more depth keeping paravanes having pressure responsive depth control mechanisms integral therein. In a more limited aspect, the invention consists of a means for remote generation of a control signal which is detected at the paravane as a signal representing a degree of adjustment. The detected signal is then compared to a reference signal derived from ambient water pressure to generate a control signal which, in turn, is applied to bias or vary the reference setting of the depth control mechanism so that it functions about a new, predetermined null point to maintain the paravane or paravanes at a newly selected depth.

Therefore, it is an object of the present invention to provide depth keeping structure for use with paravanes which is relatively simple and therefore extremely reliable in operation.

It is also an object of the invention to provide apparatus which enables accurate and continual control of the operating depth of a paravane and cable.

It is a further object of the present invention to provide apparatus which is remotely actuatable from a vessel or surface position to change the operating depth of the paravane and cable to another different selected depth within a wide range of depths.

Finally, it is an object of the present invention to provide remotely controllable depth adjusting structure which reacts quickly and accurately with very little power requirement.

Other objects and advantages of the invention will be evident from the following detailed description when read in conjunction with the accompanying drawings which illustrate the invention.

Brief description of the drawings

FIG. 1 is a side view of a paravane in vertical section showing one form of the invention;

FIG. 2 depicts one form of controller mechanism which may be employed in the device of FIG. 1;

FIG. 3 is a functional block diagram illustrating the electrical interconnection within the paravane;

FIG. 4 is a side view of an alternative form a paravane control mechanism having parts shown in partial cutaway; and FIG. 5 is a horizontal section taken in the plane of lines 5—5 of FIG. 4.

Description of the preferred embodiment

Referring to the drawings in detail, FIG. 1 illustrates a paravane 10 which is rotatably connected about a cable 12. The paravane 10 has a central, axial bore 14 through which the cable 12 is received, and means (not specifically shown) are employed to restrain paravane 10 from sliding along cable 12 without hindering its ability to rotate freely therearound. This allows the cable 12 or streamer to rotate inside of the paravane 10 without causing the paravane 10 itself to rotate. It is necessary that the paravane 10 maintain a normal attitude, i.e., keeping the axis of the diving planes horizontal or parallel to the surface of the water throughout all maneuvers of the towing vessel.

The paravane 10 consists of a torpedo-like housing 16 having an axial, cylindrical wall 18 extending therethrough to form the axial bore 14. The paravane 10 is fitted with vertical and horizontal fixed stabilizers 20 which are arranged in quadrature about the after end of housing 16, and a pair of horizontally disposed planing control shafts 22 and 24 extend outward on opposite sides through housing 16. The shafts 22 and 24 are connected to respective diving planes 26 and 28 and they are rotatable to impart planing control in a manner which will be further described below.

Various features such as the transverse framing and other internal structure of housing 16 are not shown, such being the subject matter of the aforementioned related patent applications. Similarly, the journaling and support of shafts 22 and 24 as well as the mounting of internal control chassis would come within the skill of the art. Remaining void spaces within the housing 16 may be filled with well-known weighting or buoying materials or a combination of both to attain a desired buoyancy characteristics.

A pressure responsive device 30 is suitably mounted within the cylindrical wall 18 and in a selected position to respond to vibratory pressure waves or such. Thus, a pair of energizing leads 32 may be extended down through the cable 12 for connection to a pressure transducer 34 which may be suitably imbedded within the cable 12. The transducer 34 may be a commercially available form of piezo electric device which provides a vibrational output in response to energization via control leads 32. The vibration detector 30 may be a similar type of complementing electrical device which responds to the vibrational energy to provide an electrical output on a lead 36 for input to an amplifier 38. The amplifier 38 is a standard type of A-C amplifier which provides an amplified replica of the input signal on an output lead 40.

The voltage on output lead 40 is then conducted to control a power relay 42 which applies operating power to the system from a power supply 44. The power supply 44 may be a conventional D-C source such as storage battery or such which is connected to apply power via a lead 46 to various components of the system with return through ground or common as equipped. This function of enabling power application only upon receipt of a control signal on lead 40 effects a great saving in power and extends the life and reliability of power supply 44 accordingly. Thus, power relay 42 can be energized to apply energizing power via lead 48 to energize an amplifier 50 and a control motor 52, return being through ground or common in each case. A similar output lead 54 from power relay 42 applies power to a pressure responsive resistance 56.

The pressure-responsive resistance 56 may be such as a commercially available type of pressure actuated potentiometer having its wiper contact 58 connected for proportional movement by means of a linkage 60 connected to a diaphragm 62 affixed in contact with the water surrounds. Thus, the resistance element 56 is connected between the power lead 54 and ground or common, and external water pressure exerts proportional movement through diaphragm 62 and linkage 60 to tap off a predetermined voltage through wiper contact 58 for input via lead 64 to amplifier 50. A parallel branch of output lead 40 from amplifier 38 is also applied through a conventional frequency-to-voltage converter 65 to an input of amplifier 50. Thus, the amplifier 50, a D-C amplifier or conventional form of differential amplifier, provides a control signal output on a lead 66 to energize a control winding 68 to control rotation of motor 52, as will be further described.

The rotational output from motor 52 is transmitted on a mechanical linkage 70 to operate a suitable controller mechanism 72. The controller mechanism 72 then converts the rotational input on linkage 70 to a proportional rotational movement of plane shafts 22 and 24 in concert. The controller mechanism 72 may be any of various controller mechanisms which have been described in the aforementioned copending applications as well as in an additional related application entitled "Compressed Air, Pressure-Sensing Actuator," Ser. No. 635,861 filed on May 3, 1967, in the name of Chapman and assigned to the present assignee.

FIG. 2 shows an exemplary form of controller mechanism 72 which will serve to provide the continual depth keeping function as well as to enable remotely controllable adjustment of the reference operation point. Thus, a cylinder 74 is suitably positioned within the housing 16, here shown as a lower portion of housing 16, and one end 76 is connected to communicate through a tube or hose 78 and through orifice 80 to the external surrounds of the housing 16. Thus, water at ambient pressure is allowed to fill a chamber 82 to exert force on a piston 84 which is slidably moveable within cylinder 74 in sealed relationship. The piston 84 extends a piston shaft 86 having a coupling 88 out through an opposite end 90 of cylinder 74; here again, slidable but sealed connection is made between end wall 90 and piston shaft 86 such that a chamber 92 may contain a predetermined air pressure which counteracts water pressure within chamber 82.

Piston shaft 86 is movably connected to a lever 94 which, in turn, is rigidly connected to the diving plane shaft 22. Thus, it can be seen that pressure differentials as between water pressure in chamber 82 and air pressure in chamber 92 will cause a longitudinal movement of piston 84 and this will then exert an angular movement of lever 94 about the axis or shaft 22 and the diving plane 26 is moved accordingly. Similarly, shaft 24 and diving plane 26 (FIG. 1) would be moved through an equal angular movement.

The air pressure within chamber 92 can be varied to set the reference point or desired depth about which the controller mechanism 72 will tend to stabilize. This may be varied by energizing the motor 52 in one direction or the other such that the appropriate rotational motion on linkage 70 operates a water pump 96, e.g., a conventional gear-type pump, to vary the pressure within the chamber 92. That is, pump 96 communicates from the external surrounds through an orifice 98 and tube 100, and its other end is connected through a tube 102 in communication with chamber 92. The chamber 92 will contain some partial amount of water in accordance with initial calibration and then the pump 96 can be energized in one direction or the other to pump in or remove water from within the chamber 92 so that it increases or decreases, respectively, the air pressure therewithin.

It should also be understood that the controller mechanism disclosed in the aforementioned copending application, Ser. No. 672,341, entitled "Remotely Controllable Pressure Responsive Apparatus," may also be directly controlled by the remote actuation apparatus of the present invention. This application would allow direct motor control over the spring bias type of depth reference setting as used in that particular controller mechanism.

Referring now to FIG. 3, a command signal input as derived from detector 30 through amplifier 38 may be represented as a constant frequency, A-C voltage $E_p$. The voltage $E_p$ may be further represented as $A \sin(wt)$ wherein $A$ is the amplitude and $\sin(wt)$ represents frequency with $w$ equal to the radians per second. The command voltage $E_p$ is then applied to the frequency-to-voltage converter 65 to derive a D-C voltage signal having an amplitude representative of the particular frequency of the A-C command voltage $E_p$. Thus, the D-C output voltage $V$ is equal to amplitude $A$ as varied in proportion to $w$, the radians per second characteristic. There is various well-known circuitry which may be employed as the frequency-to-voltage converter stage 65, e.g. a Schmitt trigger circuit operating into an integrator is one suitable form of circuit, or a series diode-capacitor network with hold and smooth integrating circuitry.

A reference voltage $V_p$ is also derived from wiper output 58 of the pressure responsive variable resistor 56. The positive voltage is supplied from lead 54 across the resistance element 56 and either the voltage or the resistance may be adjusted to properly calibrate the pressure-responsive resistance 56 for use as a reference element. The diaphragm 62 adjusts the position of wiper 58 and therefore the amount of reference voltage $V_p$ which may be represented as the product $(ky)$, $k$ being a calibration constant and $y$ being the actual depth variable. Thus, the instantaneous depth of the paravane is represented by the voltage $V_p$ for comparison with the command voltage $V$ and a difference correction voltage is derived therefrom.

The reference voltage $V_p$ on lead 64 and the voltage $V$ on lead 55 are applied to respective inputs of power amplifier 50, e.g. a differential amplifier, and its output on lead 66 represents a control voltage $V_o$ which is equal to $k(V-V_p)$, $k$ being the calibration constant. This voltage difference indication, the $V_o$ control voltage, represents a quantity of correction which must be introduced into the paravane control system in order to bring it from its actual operating depth to a newly selected depth as signalled from the surface or remote position.

In operation, the paravane 10 may be trailed in the water such that it will keep a predetermined depth due to the action of controller mechanism 72 (FIG. 2). An adjustment of the air pressure in chamber 92 will provide depth adjustment since a preset air pressure will provide the proper amount of countering force against the ambient water pressure present in chamber 82 to maintain diving plane 26 and 28 in a horizontal attack angle. Thereafter, if for some reason the paravane 10 goes to a greater depth, an increased water pressure is apparent in chamber 82 to move piston 84, compressing chamber 92, the piston shaft 86 serving to rotate lever 94 and diving plane shaft 22 to move diving planes 26 (and 28) in a clockwise direction. The new attack angle then serves to bring the paravane 10 back to its proper depth.

In the same manner, paravane 10 rising in the water causes a reduced pressure in water chamber 82 to allow piston 84 to move in the opposite direction such that lever 94 is turned in a manner whereby diving planes 26 (and 28) are canted forward (counterclockwise) to cause paravane 10 to seek a lower depth. The paravane 10 will continue to travel at the present depth in self-correcting manner, the preset depth being the function of the pressure within chamber 92. The continual corrective functions take place in direct proportion to the pressure differential across piston 84 between chambers 82 and 92.

The operating depth of paravane 10 may then be changed by initiating a signal from the surface or such other remote position. This may be done by energization of leads 32 in cable 12 to pulse the pressure transducer 34 into vibration at a selected, constant frequency. The selection and range of frequency is a matter of choice, however, it is contemplated to employ a signal having a frequency from 500 to 5,000 cycles per second, whereby a depth of 5 feet could be represented as 500 cycles per second and so on up to a depth of 100 feet as represented by 5,000 cycles per second. Thus, transducer 34 will pulse or provide a pressure output at some frequency which is indicative of a preset operating depth.

The detector 30 then picks up the virbational pressure effects and provides an A-C signal for amplification in amplifier 38. The A-C voltage is then applied via lead 40 to carry out its dual function. First, the A-C voltage is used to energize a power relay 42 which applies energizing power from power supply 44 to the output power amplifier 50 as well as to the pressure-responsive resistance device 56. Second, the A-C voltage is conducted through a frequency-to-voltage converter 65 to derive a D-C voltage having an amplitude value which is indicative of the desired new operating depth.

The D-C voltage from frequency-to-voltage converter 65 is applied to one input of a differential power amplifier 50, and another D-C input on lead 64 is derived from the pressure-responsive resistor 56 which indicates the actual depth. Thus, differential amplifier 50 will provide a correction or control voltage output on lead 66 which is a difference between the actual depth reference voltage $V_p$ and the new depth or command D-C voltage V.

The control voltage $V_o$ output from amplifier 50 can then be employed to energize drive motor 52 such that it controls the controller mechanism 72 to drive the paravane 10 to its new depth. Thereafter, paravane 10 will follow or control about the new depth setting.

Referring to FIG. 2, the motor 52 may be controlled to rotate in one direction or the other, depending upon the polarity of the control voltage $V_o$, to rotate pump 96 so that it pumps water into the air chamber 92 or removes existing water therefrom, either function tending to vary the pressure in chamber 92 thereby to change the operating depth point. In the event that it was desired to set the paravane 10 to a deeper operating depth, motor 52 and pump 96 would function to pump water into chamber 92 to raise the pressure therein to provide counter-balance of increased water pressure in chamber 82 due to the increased depth. Similarly, in the event that the newly selected depth were more shallow, motor 52 and pump 96 would function to remove water from within chamber 92 to allow centering of piston 84 in counteraction of deceased pressure within chamber 82.

*Alternative structure*

FIGS. 4 and 5 illustrate a variation in the construction of the controller mechanism which may be employed in paravane 10. The electronic circuitry remains the same except that the output control voltage $V_o$ from amplifier 50 is employed to control a solenoid 110 rather than an electric motor. In this alternative, a pair of tube-like passages 112 and 114 are formed along the length of paravane 10, preferably near the bottom and in symmetrical disposition. The passages 112 and 114 are each adapted to receive respective valve gates 116 and 118 in sealing relationship therethrough. The gates 116 and 118 are disposed to halfway close each of passages 112 and 114 when in their normal positions. Gates 116 and 118 are each separately controllable by such as a linear solenoid 110 to close one or the other passages 112 or 114.

The after end of passages 112 and 114 include similarly shaped housings 120 and 122 which contain respective water wheels 124 and 126 therein as disposed in rotatable relationship. The water wheel 124 is connected to an axle 128 and disposed relatively above the passage 112 so that water flowing rearwardly therethrough will rotate gear wheel 124 and axle 128 to drive a water pump 130, e.g. a gear-type water pump, in a first rotational direction. The opposite gear wheel 126 is connected to drive into an axle 132 and is disposed relatively lower than the passage 114 such that an opposite rotation may be applied to pump 130.

Pump 130 is connected to the external surrounds via a tube 134, and its other or alternate opening is connected through a conduit 136 to the air chamber 92 of a cylinder 74 similar to that of FIG. 2.

The operation of paravane 10 with the alternative structure is similar to the FIG. 1 device in the quiescent operation or the depth keeping action which functions to keep the paravane 10 at a preset depth. The alternative structure provides a mechanism whereby the operating depth may be changed from a remote position. Thus, initiation of a control pressure pulse from pressure generator 34 and cable 12 initiates conduction of an A–C signal through amplifier 38 and, in the usual manner, a new D–C voltage on lead 55 and an actual depth voltage $V_p$ on lead 64 are compared to derive a control voltage $V_o$ output signal on lead 66. This signal on lead 66 is then applied to control solenoid 110 to move the gates 116 and 118 in one direction or the other such that one of the passages 112 or 114 will be closed. The selective closure of passages 112 and 114 serves to impart water power to one of the oppositely rotatable gear wheels 124 or 126 and this serves to drive pump 130 either to put water into the air chamber 92 or to remove water therefrom. This variation of air pressure within chamber 92 then determines the operating depth in the same manner as described for the FIG. 1 embodiment.

It should be understood that transmission of depth change command may be effected by various means other than that specifically designated, i.e., transmitting means wherein the tow cable contains actuating wires and pressure transducers. For example, command actuation may be effected by means of magnetostrictively induced pressure pulses traveling through the water, pressure pulses of predetermined frequency as employed, for example, in Fathometer practice. Still other forms of wireless command communication may be effected such as those utilizing selected frequencies of sonic energy, electromagnetic energy, etc.

The foregoing discloses a novel paravane control scheme which allows the changing of the paravane operating depth from a remote location without the necessity for pulling in or otherwise approaching the seismic cable or streamer, the paravane thereafter functioning to keep the selected depth. That is, a depth control mechanism aboard the paravane will function automatically to keep the paravane at a preset depth, and this preset depth can be varied in whatever the selected increments from a remote location. The remote selection is conveyed by suitable energy transmission and detection at the paravane and the remote control device onboard the paravane functions with very low power consumption to change the preset depth. The paravane includes a self-contained power supply for energizing the onboard functions and such power supply may be of relatively small size yet long-life due to the periodic, low power requirement of energization.

What is claimed is:

1. A device for remotely adjustable control of a paravane having movable diving planes, comprising:

means for generating a vibratory pressure signal of predetermined frequency;

detector means disposed in said paravane and generating a first electrical signal output proportional to said predetermined frequency in response to detection of said vibratory pressure signal;

pressure responsive means disposed in said paravane and generating a second electrical signal output in response to the ambient water pressure;

means receiving said first and second electrical signals and generating a control signal output in response thereto;

controller mechanism including reference pressure means, said mechanism controlling said diving planes to maintain the paravane at a predetermined depth at which said reference pressure counteracts said ambient water pressure; and control means energized by said control signal to vary said reference pressure and said predetermined depth in proportion thereto.

2. A device as set forth in claim 1 wherein said detector means comprises:

piezoelectric means receiving said vibratory pressure signal in the environment of said paravane and producing a reference output signal; and frequency-to-voltage converter means for receiving said reference signal and providing said first signal output.

3. A device as set forth in claim 2 which is further characterized to include:

a power source disposed in said paravane; and power relay means energized by said reference output signal to connect said power source for energization of said pressure responsive means and said means generating a control signal output.

4. A device as set forth in claim 3 wherein said pressure responsive means comprises:

variable resistance means including a wiper output and being energized by said power source;

diaphragm means disposed on said paravane for distortion in accordance with said ambient pressure; and linkage means connecting said resistance means wiper and said diaphragm means such that said second signal output appears at said wiper output in proportion to the ambient pressure.

5. A device as set forth in claim 1 wherein said control means comprises:

motor means providing rotational output; and means receiving said rotational output and varying said reference pressure means in proportion thereto.

6. A device as set forth in claim 1 wherein said control means comprises:

first and second tubular passages extending through the length of said paravane;

pump means connected to said reference pressure means in said controller mechanism;

first and second water wheels disposed in said first and second passages, said first water wheel being disposed therein to impart clockwise rotation with respect to said pump means in response to water passing through said first passage, said second water wheel being disposed in said passage to impart counterclockwise rotation with respect to said pump means in response to water passing through said second passage;

first and second shaft members connecting the rotation of respective first and second water wheels into said pump means;

first and second gate valve means each normally disposed to extend part way across respective first and second passages; and solenoid means controlled by said control signal to slide said first and second gate valve means reciprocally to enable water passage through one or the other of said first and second passages.

7. A device as set forth in claim 5 wherein said detector means comprises:

piezoelectric means receiving said vibratory pressure signal in the environment of said paravane and producing a reference output signal; and frequency-to-voltage converter means for receiving said reference signal and providing said first signal output.

8. The device as set forth in claim 6 wherein said detector means comprises:

piezoelectric means receiving said vibratory pressure signal in the environment of said paravane and producing a reference output signal; and frequency-to-voltage converter means for receiving said reference signal and providing said first signal output.

9. In combination with a depth-keeping paravane having movable diving planes which are continuously responsive to controller mechanism which maintains a predetermined depth equal to a null point in pressure differential as between a reference pressure container in counteractive disposition to ambient water pressure, a remote control depth adjustment device comprising:

means actuated from a remote position to transmit energy having characteristic indication representing a selected operating depth;

detector means disposed on said paravane for receiving said transmitted energy and providing a first electrical output signal indicative of said operating depth;

pressure responsive means disposed in said paravane and generating a second electrical signal in response to the ambient water pressure;

means receiving said first and second electrical signals and generating a control signal output in response thereto; and control means energized by said control signal to vary said reference pressure such that a newly selected null point in differential pressure will result thereby to cause said controller mechanism to maintain said paravane at a predetermined new depth.

10. The depth adjustment device as set forth in claim 9 wherein said control means comprises:

pump means connected for reversible pumping of water between said reference pressure container and the ambient water surrounds; and drive means energized by said control signal to impart reversible pumping action to said pump means.

11. The depth adjustment device as set forth in claim 10 wherein said drive means comprises:

an electrical motor energized by said control signal to provide reversible output rotation in response thereto.

12. The depth adjustment device as set forth in claim 10 wherein said drive means comprises:

first and second rotary means for generating first and second opposite rotational movements in response to relative movement between said paravane and said ambient water; and shaft means connected to said rotary means for coupling said first and second opposite rotational movements to drive said pump means.

13. The depth adjustment device as set forth in claim 12 wherein said first and second rotary means comprise:
- first and second tubular passages extending through said paravane in line with ambient water flow;
- first and second gate valve means each disposed to partially close respective tubular passages when de-energized; and
- solenoid means connected to control said first and second gate valve means, and energized by a control signal first state to close said first tubular passage while opening the second passage, and energized by a control signal second state to close said second tubular passage while opening the first passage.

References Cited

UNITED STATES PATENTS

| | | | |
|---|---|---|---|
| 3,045,627 | 7/1962 | Eck | 114—25 |
| 3,102,505 | 9/1963 | Dickieson | 114—25 X |

MILTON BUCHLER, *Primary Examiner.*

T. B. BLIX, *Assistant Examiner.*